US011996619B2

(12) United States Patent
Darwish et al.

(10) Patent No.: US 11,996,619 B2
(45) Date of Patent: May 28, 2024

(54) ANTENNA DEVICE AND A DETECTING DEVICE HAVING THE SAME

(71) Applicant: Qatar Foundation for Education, Science and Community Development, Doha (QA)

(72) Inventors: Ahmad Darwish, Doha (QA); Shady S. Khalil, Doha (QA); Haitham Abu-Rub, Doha (QA); Hamid Toliyat, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 173 days.

(21) Appl. No.: 17/755,760

(22) PCT Filed: Nov. 5, 2020

(86) PCT No.: PCT/QA2020/050014
§ 371 (c)(1),
(2) Date: May 6, 2022

(87) PCT Pub. No.: WO2021/091409
PCT Pub. Date: May 14, 2021

(65) Prior Publication Data

US 2022/0393366 A1 Dec. 8, 2022

Related U.S. Application Data

(60) Provisional application No. 62/932,210, filed on Nov. 7, 2019.

(51) Int. Cl.
*H01Q 19/26* (2006.01)
*H01Q 1/48* (2006.01)
*H01Q 9/40* (2006.01)

(52) U.S. Cl.
CPC ............... *H01Q 19/26* (2013.01); *H01Q 1/48* (2013.01); *H01Q 9/40* (2013.01)

(58) Field of Classification Search
None
See application file for complete search history.

(56) References Cited

U.S. PATENT DOCUMENTS

| | | | | |
|---|---|---|---|---|
| 2004/0166806 A1* | 8/2004 | Salfelner | H04B 1/56 | 455/39 |
| 2008/0231521 A1* | 9/2008 | Anguera Pros | H01Q 1/243 | 343/702 |
| 2010/0117909 A1* | 5/2010 | DeJean | H01Q 21/30 | 343/702 |
| 2014/0347091 A1* | 11/2014 | Jung | G01R 31/14 | 324/764.01 |

FOREIGN PATENT DOCUMENTS

CN 108550991 * 9/2018

* cited by examiner

*Primary Examiner* — Jany Richardson
(74) *Attorney, Agent, or Firm* — K&L Gates LLP

(57) ABSTRACT

An antenna and a detecting device are provided. The antenna includes a ground plane, a pole and a microstrip line. The detecting device includes an oscilloscope and the antenna that is connected with the oscilloscope.

18 Claims, 8 Drawing Sheets

ANTENNA DEVICE AND A DETECTING DEVICE HAVING THE SAME

CROSS-REFERENCE TO RELATED APPLICATIONS

The present application is a National Stage filing under 35 U.S.C. 371 of International Application No. PCT/QA2020/050014, filed on Nov. 5, 2020, which claims priority to U.S. Ser. No. 62/932,210, filed on Nov. 7, 2019, the entire contents of which are being incorporated herein by reference.

BACKGROUND

The rapid growth of patch antennas as compact, efficient, and low-cost devices has dramatically increased the demand for such assets. However, the fabrication of patch antennas alone does not attain a large bandwidth (BW). Thus, there is a need for an antenna device having a large bandwidth with relatively small size for detection of Partial Discharge (PD) in different medium and high voltage apparatuses.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject.

The present disclosure provides an antenna device and a detecting device having the same. In particular, the present disclosure provides a class of antennas used for PD detection and localization.

According to one non-limiting aspect of the present disclosure, an example embodiment of an antenna is provided. In one embodiment, the antenna includes a ground plan, a monopole and a microstrip line.

According to another non-limiting aspect of the present disclosure, an example embodiment of a detecting device is provided. In one embodiment, the detecting device includes an oscilloscope and an antenna connected with the oscilloscope. The antenna includes a ground plane, a monopole and a microstrip line.

It should be understood that the outcomes described herein are not limited, and may be any of or different from the outcomes described in the present disclosure. To this point, other embodiments of the present disclosure will be evident from the following detailed description.

BRIEF DESCRIPTION OF THE FIGURES

Features and advantages of antenna described herein may be better understood by reference to the accompanying drawings in which.

Figure 1A:
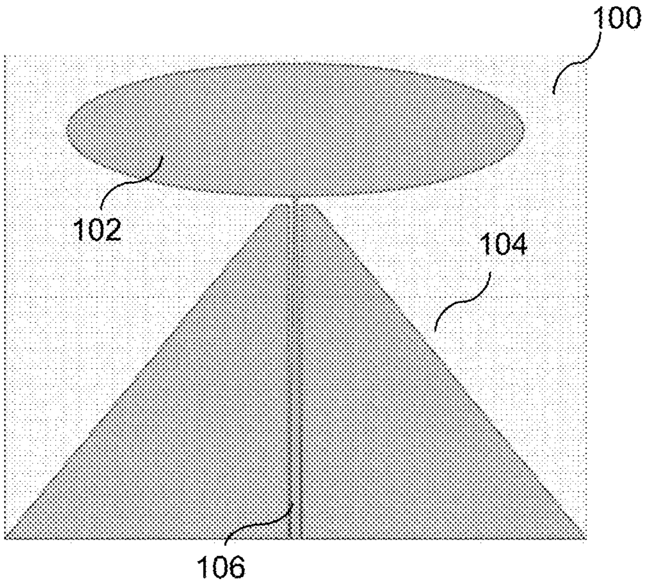
FIG. 1A illustrates an antenna device according to an embodiment of the present disclosure.

The reader will appreciate the foregoing details, as well as others, upon considering the following detailed description of certain non-limiting embodiments according to the present disclosure.

DETAILED DESCRIPTION

The embodiments will now be described more fully hereinafter with reference to the accompanying drawings, in which some, but not all embodiments of the present technology are shown. Indeed, the present technology may be embodied in many different forms and should not be construed as limited to the embodiments set forth herein.

Likewise, modifications and other embodiments of the present disclosure including the antenna device and/or the detecting device described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, any such terms are used in a generic and descriptive sense only and not for purposes of limitation.

In general, terminology may be understood at least in part from usage in context. For example, terms, such as “and”, “or”, or “and/or,” as used herein may include a variety of meanings that may depend at least in part upon the context in which such terms are used. Typically, “or” if used to associate a list, such as A, B or C, is intended to mean A, B, and C, here used in the inclusive sense, as well as A, B or C, here used in the exclusive sense. In addition, the term “one or more” or “at least one” as used herein, depending at least in part upon context, may be used to describe any feature, structure, or characteristic in a singular sense or may be used to describe combinations of features, structures or characteristics in a plural sense. Similarly, terms, such as “a”, “an”, or “the”, again, may be understood to convey a singular usage or to convey a plural usage, depending at least in part upon context. In addition, the term “based on” or “determined by” may be understood as not necessarily intended to convey an exclusive set of factors and may, instead, allow for existence of additional factors not necessarily expressly described, again, depending at least in part on context.

Unless defined otherwise, all technical and scientific terms used herein have the same meaning as commonly understood by one of skill in the art to which the invention pertains. Although any methods and materials similar to or equivalent to those described herein may be used in the practice or testing of the present technology, the preferred methods and materials are described herein.

The terminology used herein is for the purpose of describing particular example embodiments only and is not intended to be limiting. The terms "comprise", "comprises", "comprised" or "comprising", "including" or "having" and the like in the present specification and claims are used in an inclusive sense, that is to specify the presence of the stated features but not preclude the presence of additional or further features.

The present technology generally relates to an antenna sensor and/or a detecting device having the antenna sensor. In particular, the present disclosure provides a class of antennas used for Partial Discharge (PD) detection and localization, and size reduction of Ultra-High Frequency (UHF) Antennas for partial discharge detection.

Radio Frequency (RF) applications are utilized in the detection of Partial Discharge (PD) phenomenon. Ultra-High Frequency (UHF) has been given great attention due to the high reliability and effectiveness in detecting PD activities. For example, Ultra-High Frequency (UHF) technology is used for the detection of PD in medium and high voltage devices by collecting the emitted electromagnetic (EM) waves in the UHF range.

Nonetheless, given that the UHF ranges from 300 MHz to 3 GHz, UWB antennas are required to detect such waves. The lower frequency range (300 MHz) is relatively low, and thus the size of antennas operating at such frequencies can be relatively large.

The detection of Partial Discharge (PD) in medium and high voltage devices using the Ultra-High Frequency (UHF) technology has rapidly developed due to many advantages as discussed above. Even though internal PD detection (as in transformers and internally connected sensors in gas-insulated switchgears) using the UHF methods has better immunity to noise compared with the external counterparts, the development of external sensors for PD detection is more attractive because of the difficulties associated with the maintenance and installment of internal sensors; especially in old high voltage devices like GIS.

The present disclosure provides, for example, antenna sensors/devices which can be used for external sensing at lower cost compared with the conventional horn and/or log periodic antennas.

According to an embodiment of the present disclosure, there is provided an antenna device 100. As illustrated in FIG. 1A, the antenna device 100 includes a monopole 102, and a ground plane 104, and a microstrip line 106. The pole 102 may have but not limited to an elliptical shape, a ring shape and/or circular shape. The ground plane 104 may have but not limited to a rectangular shape, a square shape, a triangle shape and/or a tapered shape. The tapered shape of the ground plane 104 helps to obtain slightly varying input impedance and to increase the bandwidth. The microstrip line 106 may have a tapered shape extending from the pole 102 to a feed point or a port to control the input impedance. The microstrip line 106 may have but not limited to a resistance value of 50 ohm at the feed point. The size of the antenna device 100 may be, but not limited to, 350×272 $mm^2$. The antenna device 100 can be any suitable size. The antenna device 100 is a Coplanar Waveguide (CPW)-fed annular monopole antenna.

Figure 1B:
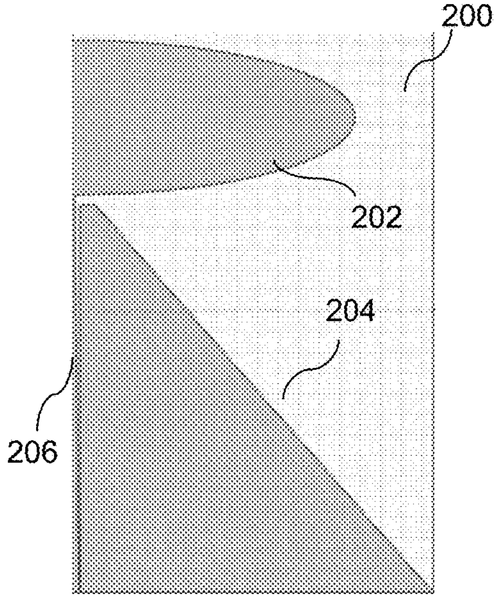
FIG. 1B illustrates an antenna device according to an embodiment of the present disclosure.

According to an embodiment of the present disclosure, there is provided an antenna device 200. As illustrated in FIG. 1B, the antenna device 200 includes a pole 202, and a ground plane 204, and a microstrip line 206. The pole 202 has a reduced size, for example, a half size. The pole 202 has a half elliptical shape. The pole 202 may have other suitable shape such as an elliptical shape, a ring shape and/or circular shape. The ground plane 204 has a triangle shape. The ground plane 204 may have other suitable shape such as a rectangular shape, a square shape, and/or a tapered shape. The microstrip line 206 has a tapered shape from one side and straight from the other side. However, the microstrip line 206 may be in any other suitable shapes. The size of the antenna device 200 is greatly reduced by around 50% in comparison with the antenna device 100. For example, the size of the antenna device 200 is 187×272 $mm^2$. However, the antenna device 200 can be any suitable size.

Figure 1C:
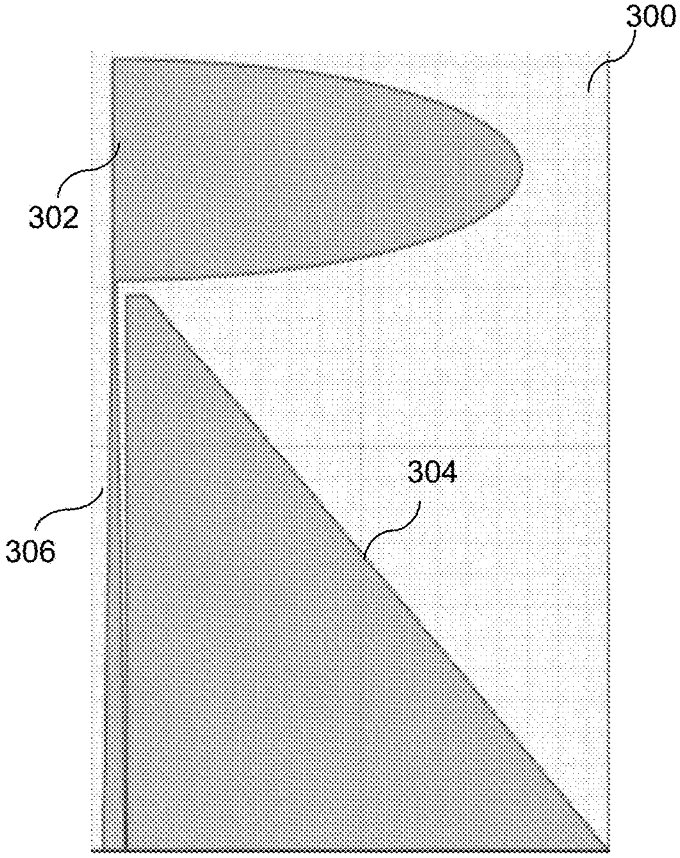
FIG. 1C illustrates an antenna device according to an embodiment of the present disclosure.

According to an embodiment of the present disclosure, there is provided an antenna device 300. As illustrated in FIG. 1C, the antenna device 300 includes a pole 302, and a tapered ground plane 304, and a micro strip line 306. The antenna device 300 has a similar configuration as the antenna device 200 as illustrated in FIG. 1B except for the shape of the microstrip line 306, and a slight extension of the substrate used to build the antenna. For example, the microstrip line 306 has a tapered shape toward to the pole 302. The tapered shape of the microstrip line 306 helps to control the input impedance and to improve its performance as compared with the antenna device 200.

Figure 2A:
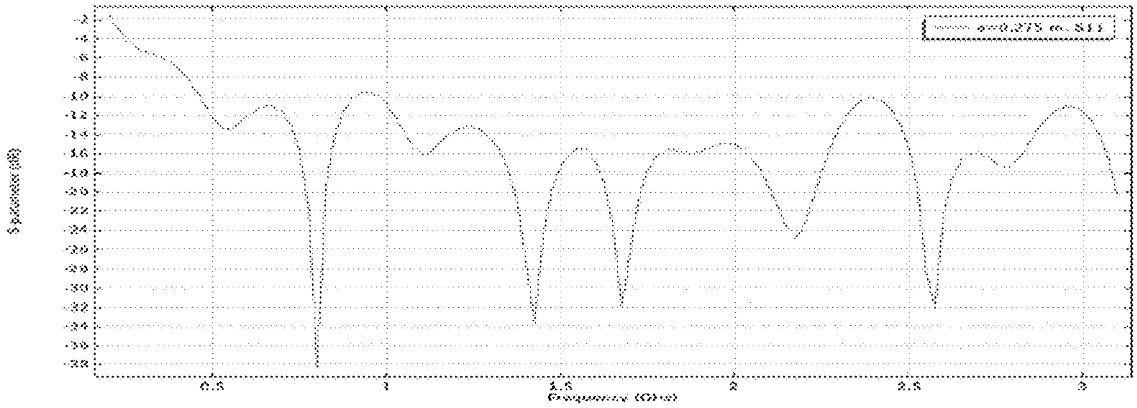
FIGS. 2A-2B illustrate reflection coefficients of an antenna device according to an embodiment of the present disclosure.
Figure 2B:
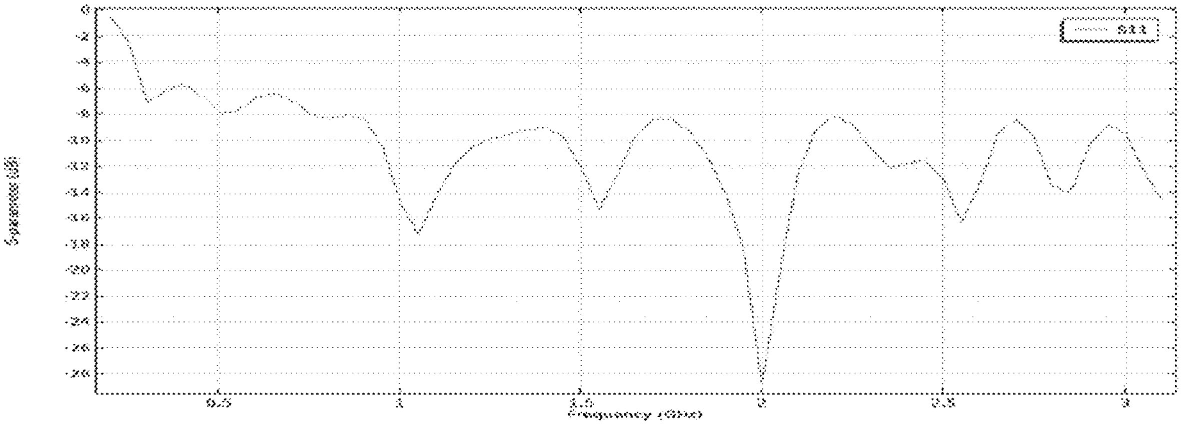
Figure 2C:
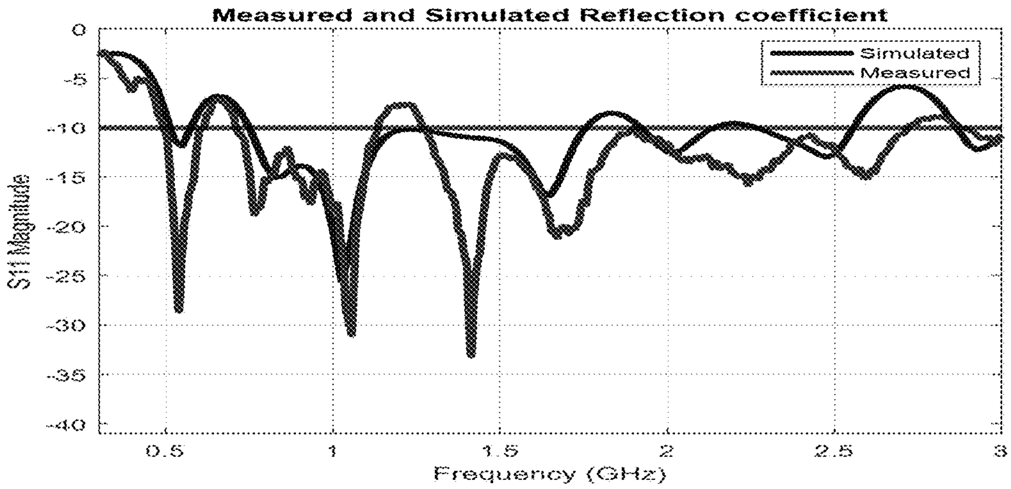
FIG. 2C illustrates comparison between a measured reflection coefficient and a simulated reflection coefficient.

FIG. 2A to FIG. 2C illustrate the obtained reflection coefficient for the antenna device 100, antenna device 200 and antenna device 300, respectively. As illustrated in FIG. 2A, the antenna device 100 shows superior performance over most of the frequency range. The antenna device 200 with reduced size as shown FIG. 2B operates inferiorly as the frequency band starts from around 0.9 GHz. It also has some frequency band notches at different frequencies. Nonetheless, by replacing the micro strip line with the tapered shape, the performance can be improved because the tapered line allows wider Line width reducing the input impedance from the feed point. This is verified by the reflection coefficient diagram as shown in FIG. 2C, both in simulation and experimental results.

Figure 3A:
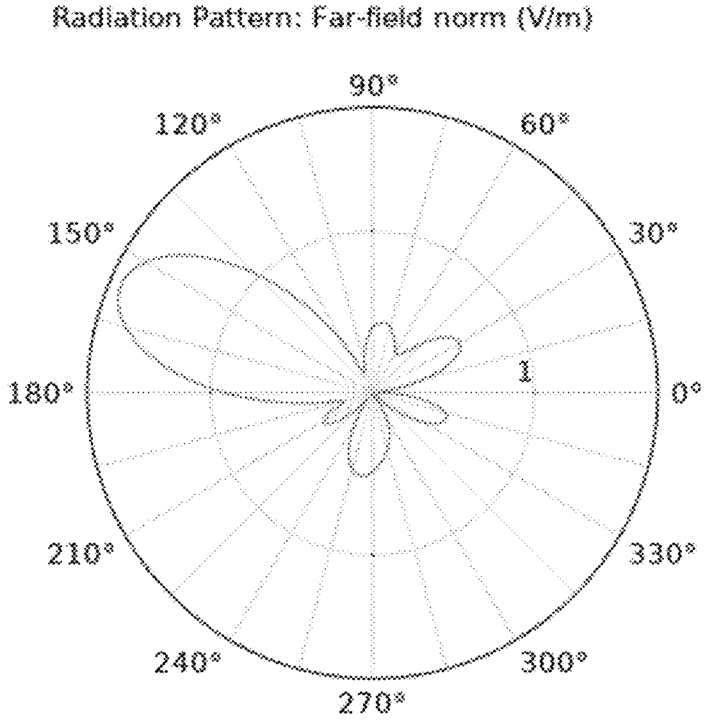
FIGS. 3A and 3B illustrate radiation patterns of an antenna device at 1.5 GHz (FIG. 3A) and 3 GHz (FIG. 3B), respectively, according to an embodiment of the present disclosure.
Figure 3B:
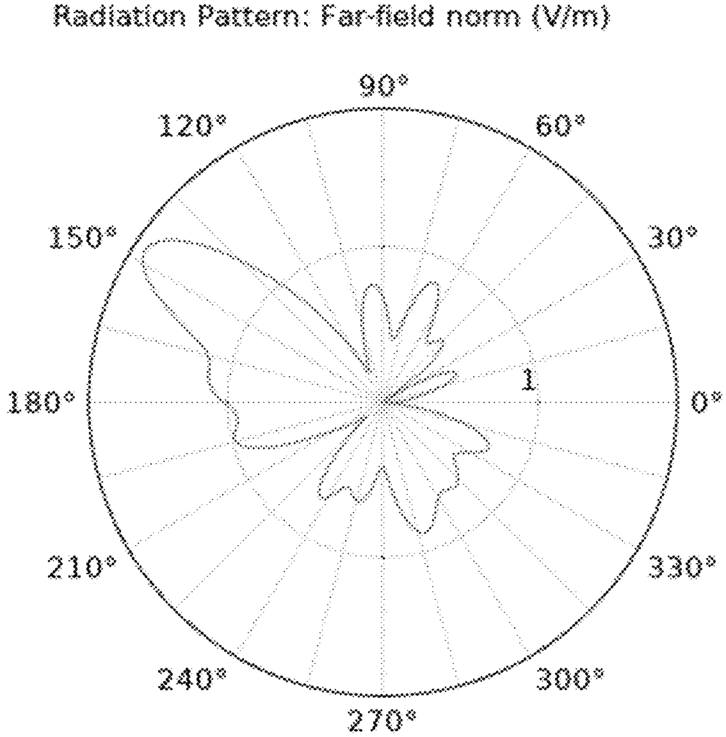

FIGS. 3A to 3B show the radiation pattern of an antenna device according to an embodiment of the present disclosure. The antenna device has a reduced size antenna device 300. FIG. 3A illustrates the radiation pattern at 1.5 GHz and FIG. 3B illustrates the radiation pattern at 3 GHz. As illustrated in FIG. 3A and FIG. 3B, the antenna device is mainly receiving waves coming from a single direction at high frequencies that helps in reducing the noise coming from the other direction when used for external sensing, for example, in GIS. Nonetheless, at low frequencies, the antenna device behaves like a dipole antenna, such as a donut-shaped radiation pattern.

Figure 4A:
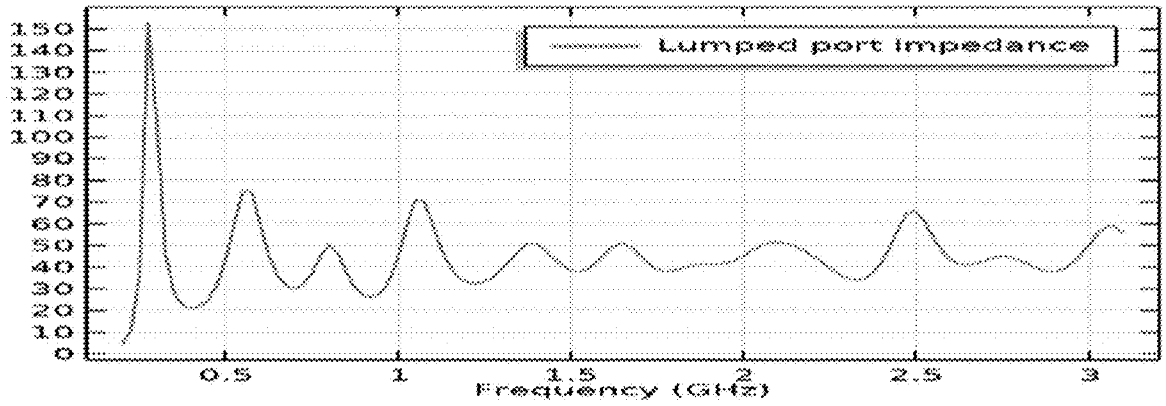
FIG. 4A illustrates an input impedance diagram for an antenna device according to an embodiment of the present disclosure.
Figure 4B:
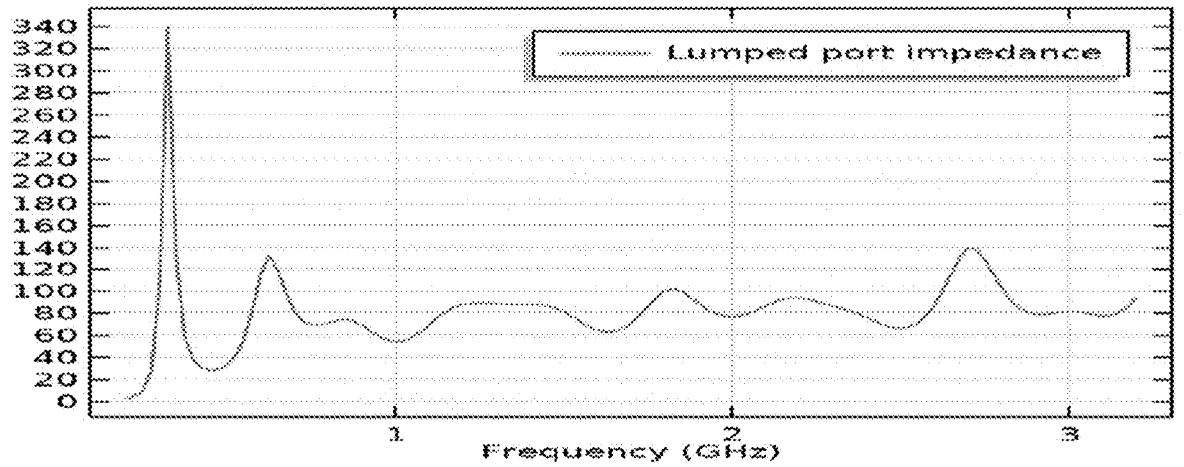
FIG. 4B illustrates an input impedance diagram for an antenna device according to another embodiment of the present disclosure.

FIGS. 4A to 4B show the input impedance diagrams of the antenna device 100 and the antenna device 300, respectively. The results show that the input impedance of the antenna device 300 with reduced size maintains similar values with respect to the antenna device 100.

Figure 5A:
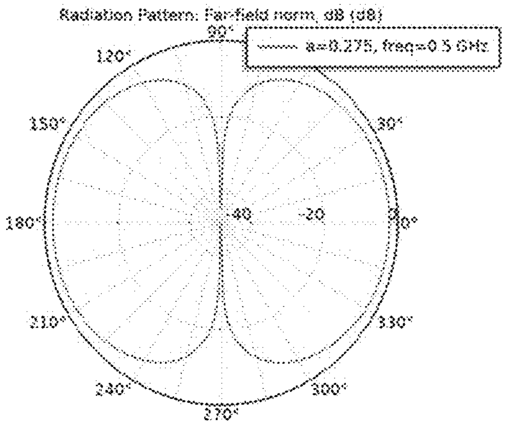
FIGS. 5A to FIG. 5F illustrate radiation patterns of an antenna device at 0.5 GHz (FIG. 5A), 1 GHz (FIG. 5B), 1.5 GHz (FIG. 5C), 2 GHz (FIG. 5D), 2.5 GHz (FIG. 5E), and 3 GHz (FIG. 5F), respectively, according to an embodiment of the present disclosure.

FIGS. 5A to 5F show the radiation pattern of the antenna device 100 according to an embodiment of the present disclosure. FIG. 5A illustrates the radiation pattern at 0.5

Figure 5B:
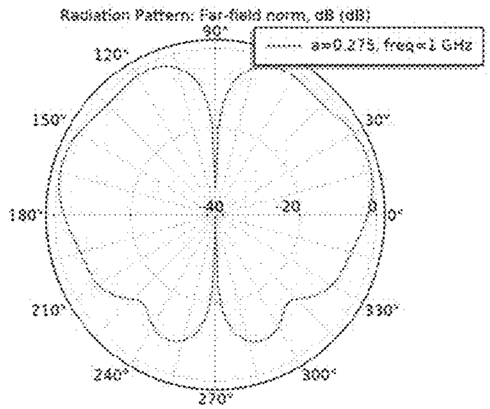
Figure 5C:
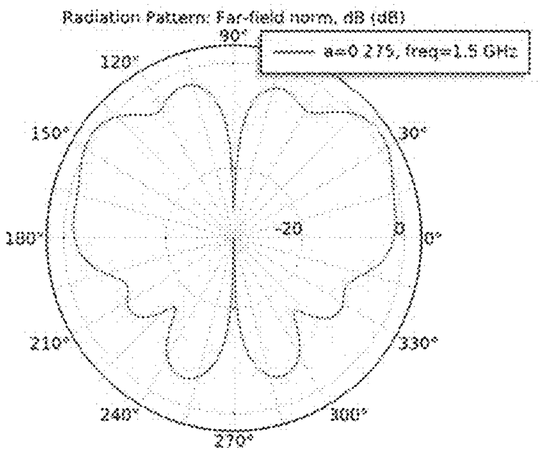
Figure 5D:
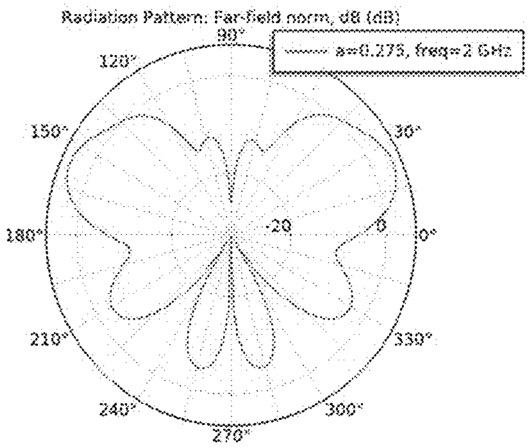
Figure 5E:
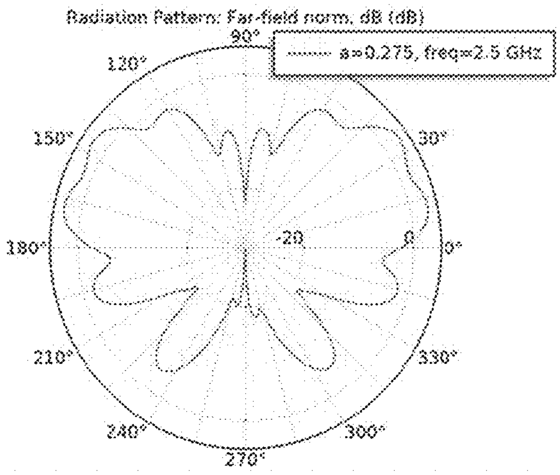
Figure 5F:
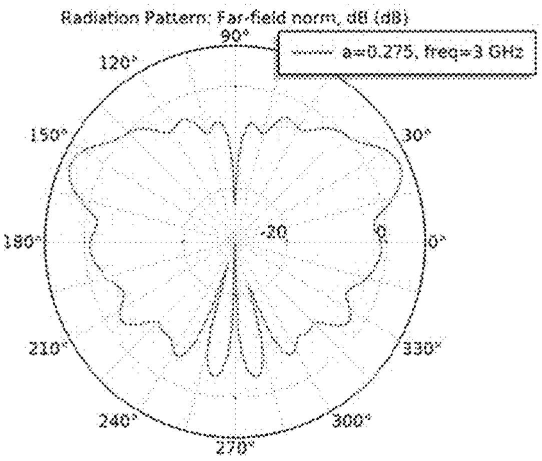

GHz; FIG. 5B illustrates the radiation pattern at 1 GHz; FIG. 5C illustrates the radiation pattern at 1.5 GHz; FIG. 5D illustrates the radiation pattern at 2 GHz; FIG. 5E illustrates the radiation pattern at 2.5 GHz; FIG. 5F illustrates the radiation pattern at 3 GHz.

Figure 6A:
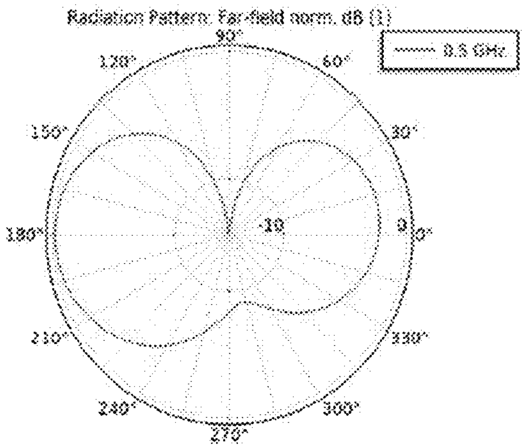
FIGS. 6A to FIG. 6F illustrate radiation patterns of an antenna device at 0.5 GHz (FIG. 6A), 1 GHz (FIG. 6B), 1.5 GHz (FIG. 6C), 2 GHz (FIG. 6D), 2.5 GHz (FIG. 6E), and 3 GHz (FIG. 6F), respectively, according to an embodiment of the present disclosure.
Figure 6B:
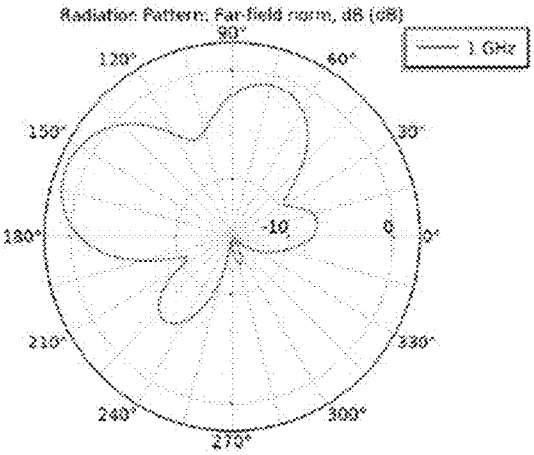
Figure 6C:
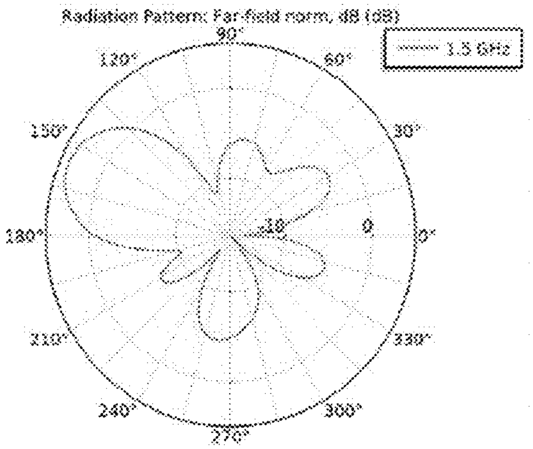
Figure 6D:
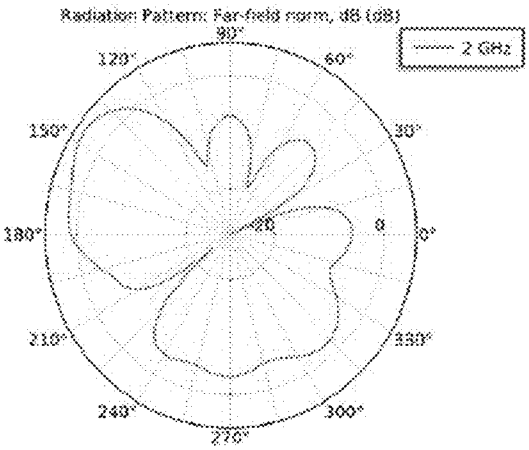
Figure 6E:
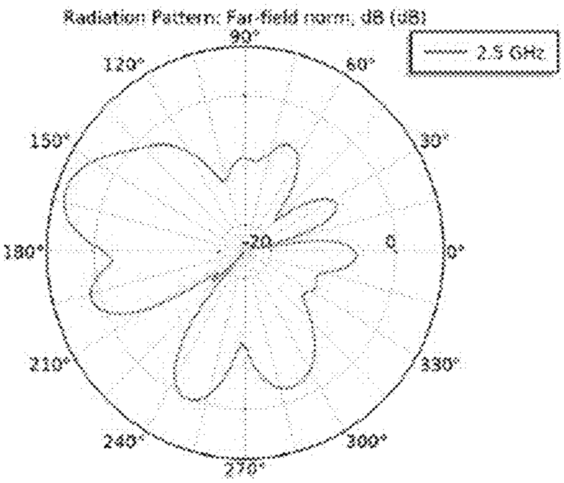
Figure 6F:
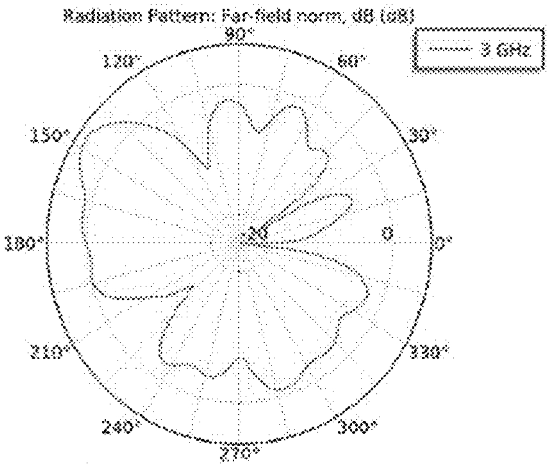

FIGS. 6A to 6F show the radiation pattern of the antenna device 300 according to an embodiment of the present disclosure. FIG. 6A illustrates the radiation pattern at 0.5 GHz; FIG. 6B illustrates the radiation pattern at 1 GHz; FIG. 6C illustrates the radiation pattern at 1.5 GHz; FIG. 6D illustrates the radiation pattern at 2 GHz; FIG. 6E illustrates the radiation pattern at 2.5 GHz; FIG. 6F illustrates the radiation pattern at 3 GHz.

Figure 7:
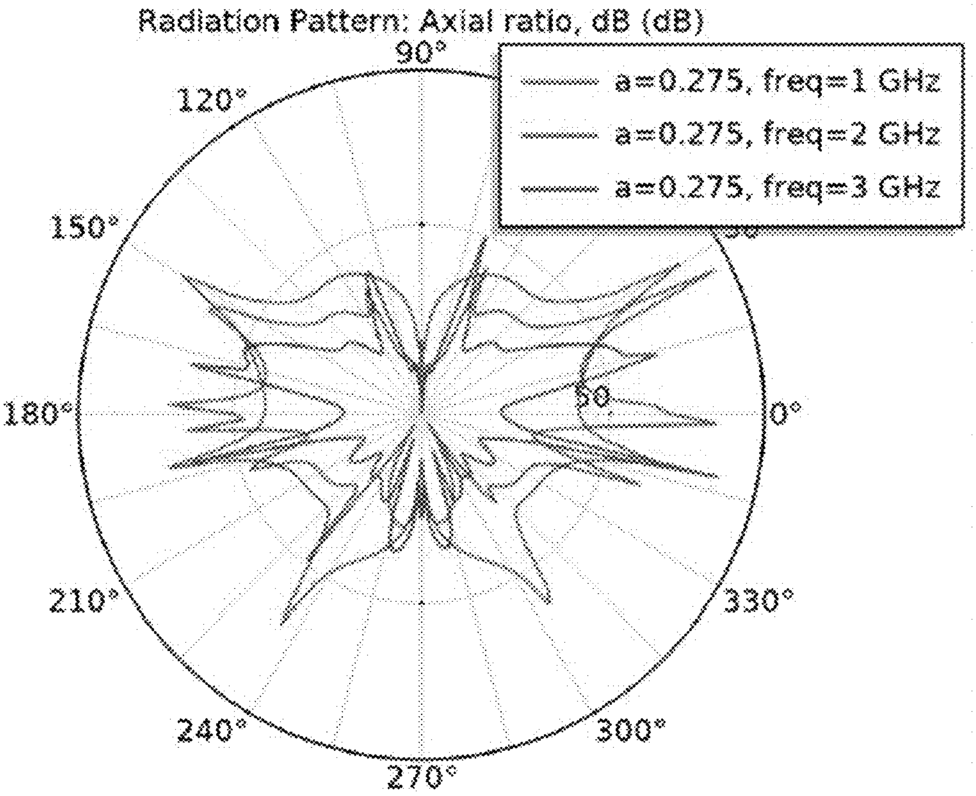
FIG. 7 illustrates an axial ratio of a radiation pattern of an antenna device according to an embodiment of the present disclosure.
Figure 8:
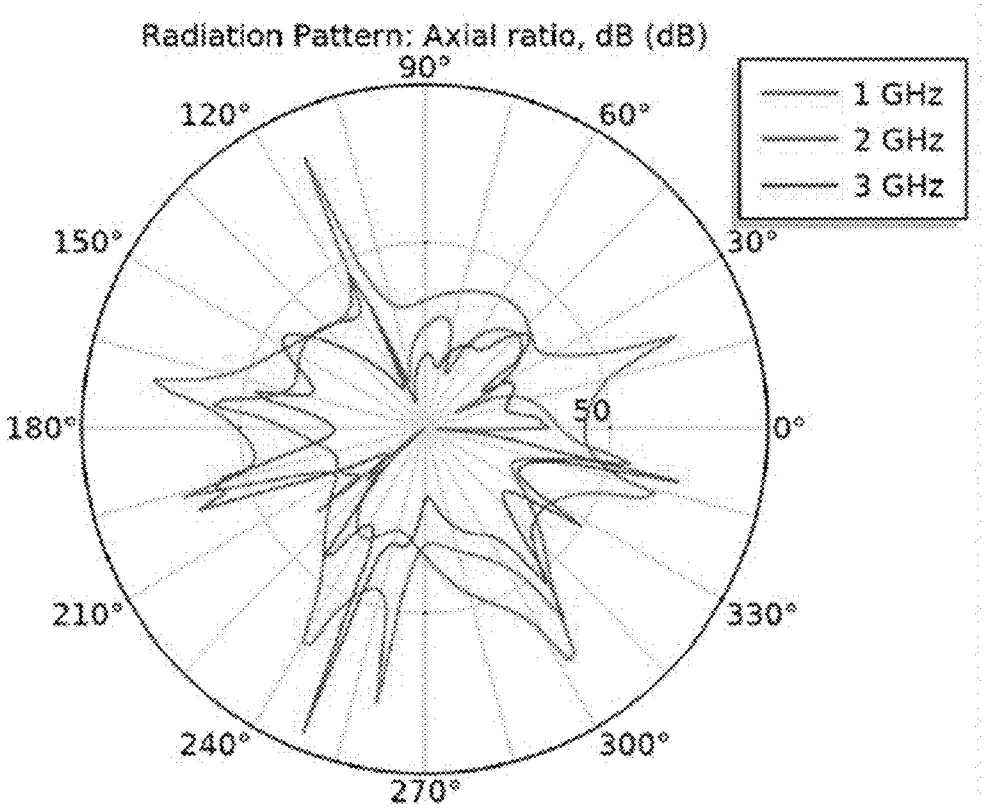
FIG. 8 illustrates an axial ratio of a radiation pattern of an antenna device according to an embodiment of the present disclosure.

FIG. 7 illustrates an axial ratio of the radiation pattern of the antenna device 100 according to an embodiment of the present disclosure. FIG. 8 illustrates an axial ratio of the radiation pattern of the antenna device 300 according to an embodiment as described above.

According to an embodiment of the present disclosure, there is provided a PD detecting device. The detecting device includes an oscilloscope and an antenna device connected with the oscilloscope. The antenna device may have similar configurations to an embodiment as described above. For example, the antenna device may have similar configuration as the antenna device 100 as illustrated in FIG. 1A, and the antenna device 300 as illustrated in FIG. 1C.

According to an embodiment of the present disclosure, an antenna sensor that can be used for external sensing at lower cost in comparison with the conventional horn and/or log periodic antennas is provided. The antenna sensor includes a reduced-size Coplanar Waveguide (CPW)-fed annular monopole antenna. The multi-physics finite element analysis package of COMSOL software has been used to build and optimize the dimensions of the sensor to make it usable in the UHF frequency band (0.3 GHz-3 GHz). Simulation results demonstrated that the antenna sensor can operate at frequencies ranging between 0.5 GHz and 2.6 GHz with good gain covering most of the UHF frequency band.

One advantage of the antenna sensor, for example, is utilizing the CPW-fed monopole antennas in the detection of PD in GIS devices. A tapered microstrip line is connecting the elliptical monopole with the 50-ohm coaxial line to improve the impedance matching over a large frequency range. Obtained results include, for example, input impedance, and reflection coefficient. The antenna sensor has narrow beam-width at high frequencies reducing the noise coming from other directions. This improves the detection directivity of the sensor. Moreover, with the utilization of the symmetry of the implemented sensors, the length of the antenna sensor can be largely reduced without having a large impact on the performance of the antenna.

A comparison between the antenna devices according to an embodiment of the present disclosure and conventional antennas is provided in Table 1.

TABLE 1

Comparison between antennas in this work and conventional antennas

| Antenna Type | Horn | Log-Periodic | Loop | Dipole | Spiral | Moore Fractal | Microstrip | This work |
|---|---|---|---|---|---|---|---|---|
| Bandwidth | Very Large | Very Large | Moderate | Very Small | Large | Moderate to Large | Very Small | Large |
| Gain | Very Large | Large | Small | Small | Moderate | Large | Moderate | Moderate |
| Size | Very Large | Extremely Large | Very Small | Very Small | Moderate | Small | Depends on the frequency of operation | Moderate |
| Price | Very Expensive | Very Expensive | Very Cheap | Very Cheap | Cheap | Cheap | Cheap | Cheap |
| Polarization | Linear | Linear | Linear | Linear | Circular | Circular | Linear | Linear |
| Ease of Fabrication | Very Difficult | Very Difficult | Easy | Easy | Easy | Easy | Easy | Easy |

According to an embodiment of the present disclosure, the antenna devices are planar types and are printed directly into Printed Circuit Boards (PCBs). PCB based antennas have many advantages, for example, including ease of fabrication, light weight, and low cost. The antenna device can operate with a quasi-constant impedance over a very large frequency band. This property is important in PD detection because the generated pulses in the event of PD have a short time-domain representation. Thus, the antenna devices cover a broad frequency spectrum reaching few GHz. In other words, such pulses have high energy components at high frequency components because of the rapid changes in a short period of time. The antenna device having a suitable size is configured to cover low frequency components. Thus, the antenna device is, for example, suitable for external PD detection in GIS. This could be done, for example, by placing the antenna device near one of the apertures made on the outer enclosure of the GIS to allow the electromagnetic waves to escape the enclosure. The placement of such sensors externally is similar to the placement of horn antennas used for external PD detection in the industry.

Another advantage of the antenna device is that the mass production of the antenna is much cheaper than the production of conventional horn and log-periodic antennas for PD sensing in the industry. The antenna device according to an embodiment of the present disclosure has desirable gain, linearly polarized and high directivity; especially when the size of the antenna device is reduced. The gain is an important aspect because the collected signals due to PD are usually weak. Indeed, only small part of the generated signals would be able to escape the enclosure making the collected electromagnetic waves even weaker. Thus, the antenna device has desirable gain to overcome this issue. Although the polarization of the radiated waves due to PD is very hard to be predicted, the waves escaping the enclosure from apertures should be linearly polarized for the electromagnetic field to meet the boundary conditions. Thus, the use of the antenna device having linear polarization for the external sensing would help avoid the unnecessary losses associated with the difference in polarization between the waves and the antenna device.

Regarding the directivity of the antenna device, simulation results demonstrated that the antenna device 100 having a full size as shown in FIG. 1A is highly directive in two directions, such as, when the pole has a full size. This could help reduce the noise coming from other directions by properly placing the antenna device such that the maximum directive gain is placed towards the aperture. Noise can further be decreased by reducing the length of the sensor. Length reduction utilizes the structural symmetry of the antenna along one axis. This makes the antenna device 300 having a reduced size as shown in FIG. 1C highly directive in a single direction, such as, when the pole has a half size.

The finite element Multi-physics package of COMSOL was used to decide the geometry of the antenna device with a goal to ensure that the antenna device covers as much as possible of the UHF frequency band. Moreover, the utilization of size reduction of the antenna device to reduce noise coming from the environment for PD detection and measurement. According to an embodiment of the present disclosure, the antenna has been reduced in size without losing much of its operating performance by utilizing the symmetrical structure of the antenna.

The results obtained from the finite element Multi-physics package of COMSOL show that the antenna devices have broadband characteristics and good gain over most of the frequency range.

According to an embodiment of the present disclosure, the antenna pattern of the antenna device is printed directly into a PCB substrate. For example, a PCB substrate is used as the basis for the antenna device. One port of the CPW is connected through a BNC connector and coaxial line to an oscilloscope. The Multi-physics package of COMSOL software is used to simulate the antenna device. For example, the S11 parameters, and input impedance of the antenna device are simulated, and results show that the antenna device can properly receive signals generated by the PD source over most of the UHF frequency range.

According to an embodiment of the present disclosure, there is provided an antenna device. The antenna device has an elliptical/ring pole, a tapered ground plane, and a tapered microstrip line. The microstrip line connecting the elliptical/ring pole to a feed point improves the impedance matching of the antenna device over a larger bandwidth. The tapered ground plane is also used to increase the bandwidth of operation. Utilizing the symmetrical structure of the antenna device to reduce the size without losing much of the bandwidth of operation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An antenna, comprising:

a pole, having a shape with a maximum width dimension larger than a maximum height dimension;

a first ground plane and a second ground plane, each having a tapering shape, with:

a first side parallel to the width dimension of the pole;

a second side parallel to the width dimension of the pole, located further from the pole than the first side is located relative to the pole, and being longer than the first side;

a third side connected to the first side and the second side;

a fourth side connect to the first side and the second side opposite to where the third side is connected respectively thereto, that tapers from the second side towards the first side; and a microstrip line, disposed between the third side of each of the first ground plane and the second ground plane, and connected to the pole to be centrally aligned to the pole where the maximum height dimension is defined.

2. The antenna of claim 1, wherein the pole includes a monopole.

3. The antenna of claim 1, wherein the microstrip line has a tapered shape toward to the pole.

4. The antenna of claim 1, wherein the antenna is configured to detect partial discharge.

5. The antenna of claim 1, wherein the antenna is directive in two directions.

6. The antenna of claim 1, wherein a first distance between the microstrip line and the third side of the first ground plane tapers to be larger closer to the pole and smaller further from the pole, and wherein a second distance between the microstrip line and the third side of the second ground plane tapers to be larger closer to the pole and smaller further from the pole.

7. The antenna of claim 1, wherein the first ground plane exhibits mirror symmetry to the second ground plane on an axis defined by the microstrip line.

8. A detecting device, comprising:

an oscilloscope, and an antenna connected with the oscilloscope, wherein the antenna includes:

a pole, having a shape with a maximum width dimension larger than a maximum height dimension;

a first ground plane and a second ground plane, each having a tapering shape, with:

a first side parallel to the width dimension of the pole;

a second side parallel to the width dimension of the pole, located further from the pole than the first side is located relative to the pole, and being longer than the first side;

a third side connected to the first side and the second side;

a fourth side connect to the first side and the second side opposite to where the third side is connected respectively thereto, that tapers from the second side towards the first side; and a microstrip line, disposed between the third side of each of the first ground plane and the second ground plane, and connected to the pole to be centrally aligned to the pole where the maximum height dimension is defined.

9. The detecting device of claim 8, wherein the pole includes a monopole.

10. The detecting device of claim 8, wherein the microstrip line has a tapered shape toward to the pole.

11. The detecting device of claim 8, wherein the antenna is configured to detect partial discharge.

12. The detecting device of claim 8, wherein the antenna is directive in two directions.

13. The detecting device of claim 8, wherein a first distance between the microstrip line and the third side of the first ground plane tapers to be larger closer to the pole and smaller further from the pole, and wherein a second distance between the microstrip line and the third side of the second ground plane tapers to be larger closer to the pole and smaller further from the pole.

14. The detecting device of claim 8, wherein the first ground plane exhibits mirror symmetry to the second ground plane on an axis defined by the microstrip line.

15. An antenna, comprising:

a pole, having a half-elliptical shape, with a width dimension larger than a height dimension;

a ground plane, having a tapering shape, with:

a first side parallel to the width dimension of the pole;

a second side parallel to the width dimension of the pole, located further from the pole than the first side is located relative to the pole, and being longer than the first side;

a third side connected to the first side and the second side;

a fourth side connect to the first side and the second side opposite to where the third side is connected respectively thereto, that tapers the ground plane from the second side towards the first side; and a microstrip line, connected on a first send to the pole where the half-elliptical shape terminates at a straight edge, the microstrip line running to a second end, wherein a distance between the microstrip line and the third side of the ground plane tapers to be larger closer to the pole and smaller further from the pole.

16. The antenna of claim 15, wherein the pole includes a monopole.

17. The antenna of claim 15, wherein the antenna is directive in one direction.

18. The antenna of claim 15, wherein the antenna is configured to detect partial discharge.

* * * * *